XR 3,167,612
CROSS REFERENCE SEARCH ROOM

Jan. 26, 1965 H. STRICKHOLM 3,167,612

ELECTRO-OPTICAL SCANNING APPARATUS UTILIZING AN OPTICAL TRANSMISSION LINK

Filed June 1, 1961 2 Sheets-Sheet 1

INVENTOR
HARRY STRICKHOLM
BY E. R. Evans
his ATTORNEY

3167612
NO OR CLASSIF

INVENTOR
HARRY STRICKHOLM
BY E. R. Evans
his ATTORNEY

United States Patent Office 3,167,612
Patented Jan. 26, 1965

3,167,612

ELECTRO-OPTICAL SCANNING APPARATUS UTILIZING AN OPTICAL TRANSMISSION LINK

Harry Strickholm, Dumont, N.J., assignor to Litton Systems, Inc., Beverly Hills, Calif.

Filed June 1, 1961, Ser. No. 114,164
4 Claims. (Cl. 178—7.1)

This invention relates to scanners or read-out devices for facsimile and other intelligence recording systems, and more particularly it relates to electro-optical apparatus for devices of this character.

A principal object of the invention is to provide a scanning or read-out means employing a novel light transmission link between two terminals of such means.

Another object of the invention is to provide a light or radiant energy link between a light source and a light-sensitive device whereby one terminal of the link is of one geometric configuration, for example a straight line, while the opposite terminal of the link is of a different geometric configuration, for example circular.

Another object is to provide a novel scanning or read-out system for light values employing a light-transmitting or optical fiber assembly which has one terminal portion adjacent the subject matter to be scanned and the other terminal portion adjacent a scanning arrangement including a light-sensitive device, and wherein the fibers are used to transmit light to illuminate the subject matter while simultaneously receiving light reflected from that subject matter for excitation of the light-sensitive device.

A feature of the invention relates to a novel radiant energy transmission link for so-called flat type scanners wherien bunched optical fibers or filaments are disposed at one end in a linear array adjacent the subject matter to be scanned, while at the opposite end they are arranged in a non-linear array wherein the separate fibers can be continuously and recurrently scanned by a rotating element.

Another feature relates to a scanning arrangement especially designed for facsimile machines and the like, employing a multiplicity of optical fibers or filaments of sub-elemental cross section and so arranged that a plurality of fibers are utilized for each scanning area of elemental size in subject matter to be scanned, the fibers or filaments being anchored at one end adjacent the subject matter in a linear array, and at the opposite end in a circular array. In accordance with this feature of the invention, the scanning arrangement is such that a light beam from a light source can be transmitted in one direction through the fibers to the subject matter and the light values reflected from the subject matter can be retransmitted back in the opposite direction through the same fibers to a light-sensitive device or phototube.

A further feature relates to the novel organization, arrangement, and relative location and interconnection of parts as described below, which cooperate to provide an improved electro-optical scanning or read-out system.

Other features and advantages not specifically enumerated will be apparent after a consideration of the following detailed description and the appended claims.

In the drawing, which is illustrative of the invention,

The invention is predicated upon the use of transparent so-called optical fibers or filaments for transmitting light waves through the filament lengths and involves a novel geometric configuration of the terminal ends of the fibers. Such fibers may be of any well known light transmitting material such as quartz, transparent plastics or glass. Preferably, each fiber is of a sub-elemental or hair-like cross section, for example having a diameter of two or three thousandths of an inch. The external surface of each fiber is preferably treated or coated to prevent loss of light through that surface. Thus, when one end of a fiber is illuminated, the light waves are transmitted by total reflection throughout the length of the fiber.

Figure 1:
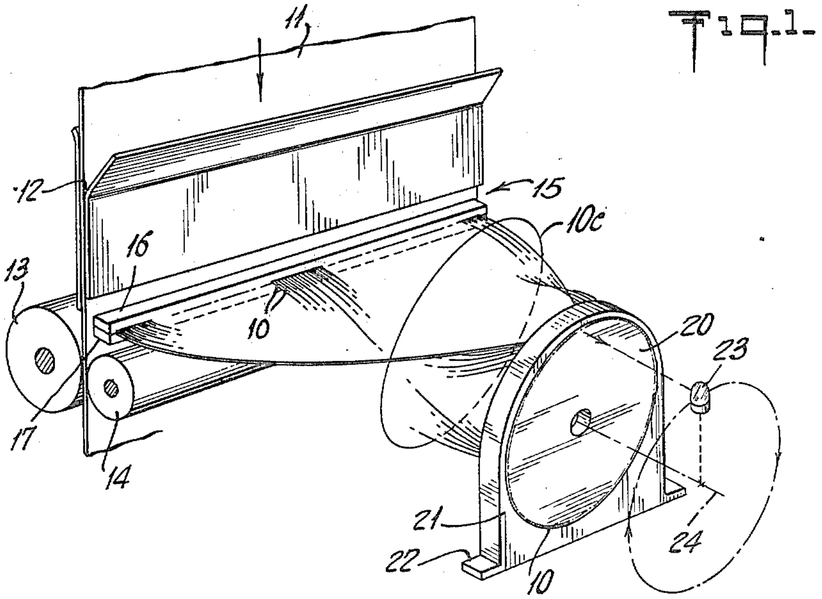
FIG. 1 is a perspective view of the more important parts of a facsimile scanning system of the so-called flat type and embodying features of the invention.

According to the embodiment of the invention shown in FIG. 1, these sub-elemental optical fibers are arranged in bundles 10 so that the minute cross-sectional area of each bundle corresponds to the area of resolution of each elemental spot on the subject matter to be scanned. For example, the resolution area may be approximately 0.01″ x 0.01″. Each bundle 10 consists of a number of elemental optical fibers 10*a*, shown in highly magnified form in FIG. 4, wherein the fiber is provided with an external light-reflecting coating 10*b* of the usual character. The fibers are cemented or fastened together to form bundles 10, and these bundles are all cemented toegther at the ends to form unitary surface portions which are optically ground or finished so as to transmit light or optical images from a first or object plane, to a second spatially disposed plane of any orientation with respect to the object plane, and without appreciable loss of light and without any substantial aberration or distortion. The fiber diameter and the number of fibers in each elemental bundle is determined by the detail in the image or area to be scanned. Normally the individual filaments or fibers for fine line scanning apparatus can be approximately two or three thousandths of an inch in diameter and preferably with each filament of the same diameter and with the filaments arranged in adjacent or closely spaced and generally parallel relation at both ends. The fiber-optics assembly 10*c* serves as a light transmission link for transmitting rays of light forming an image at the object plane to the opposite or light-emergent plane, and permits the light or optical image to be directed along any desired curvilinear path between the light-immergent and the light-emergent ends of the fibers.

In FIG. 1 of the drawing by way of example, there are shown the more important parts of a facsimile transmitter of the flat type, that is where the copy sheet 11 is fed as a flat surface past the scanning head. This general type of flat scanner may include structural details shown in my prior U.S. Patent No. 2,933,557, granted April 19, 1960. The subject matter copy 11 may be in the form of a flat sheet which, after being inserted into the feed slot or guide 12, is advanced, for example, in the direction of the arrow at a predetermined rate under control of feed roller 13 and pressure roller 14, past a linear scanning head 15, according to the invention. This linear scanning head causes the subject matter on blank 11 to be scanned in successive parallel lines or strips across the width of the blank. The length of each such strip will, of course, be correlated with the transverse width of the blank 11 to be scanned and the width of each such strip will be in accordance with the desired detail of resolution, or in other words, the dimensions of the scanning elemental area. It will be understood, of course, that the point-by-point scanning of each elemental strip or line on the subject matter is effected in synchronism with a corresponding point-by-point scanning or recording process at a distant facsimile machine, as is well known in the facsimile art.

Figures 2, 4:
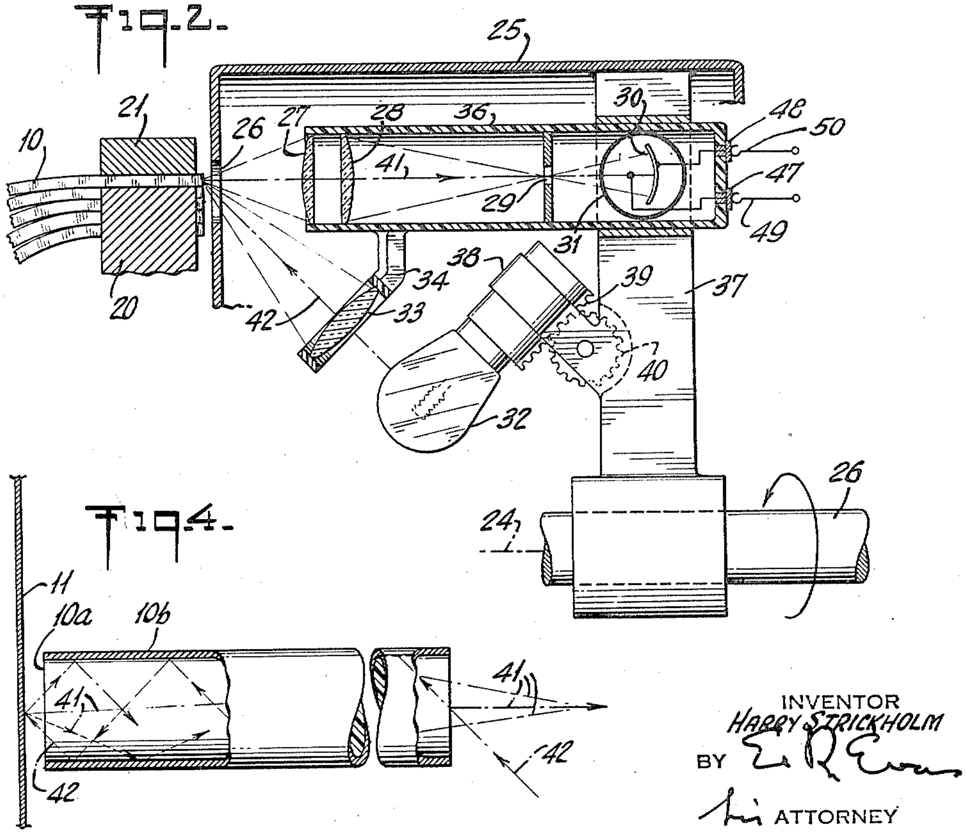
FIG. 2 is a detailed view of part of the system of FIG. 1.
FIG. 4 is a more highly magnified view of a single optical fiber as used to transmit radiant energy in both directions according to the invention.

In accordance with the invention, the ends of the optical unit 10c are anchored in any suitable manner so as to form at one end a rigid linear array adjacent to and parallel to the sheet 11, as indicated in FIGS. 1 and 4. Thus, the bundles of fibers 10 can be clamped between a pair of opposed rigid strips or rods 16, 17, suitably fastened by means (not shown) to the frame of the machine and so that the ends of the bundles are in slightly spaced relation to the sheet 11, as shown in FIG. 4. Since the bundles are individually flexible, they can in accordance with the invention, have their opposite ends arranged in a circular array, and held in this circular array by any suitable means.

Figure 3:
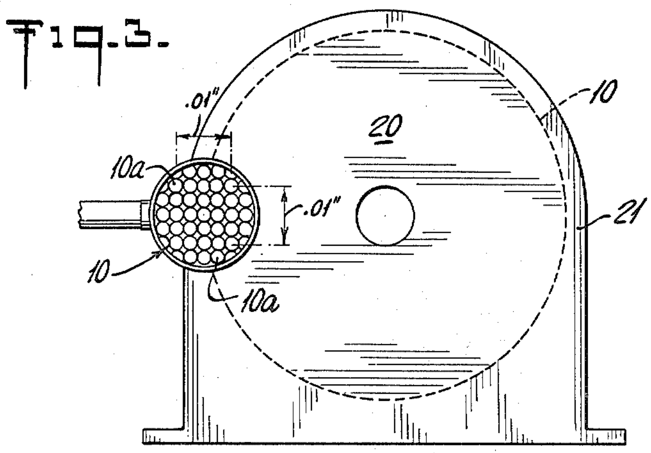
FIG. 3 is a detailed view of FIG. 1, showing the optical fibers in highly magnified form.

One conventional way of forming the fibers in bundles is as follows: An optical filament is wound around a cylindrical form with the adjacent turns in contact. The turns are then cemented or clamped together along the length of the form but without, of course, cementing or clamping them to the said form. Then the cemented fibers can be severed along the line where they are cemented together and removed from the form, thus forming a single-layer bundle of adjacent parallel fibers. If a plural-layer bundle is required, as in the present instance, then the filament may be wound in the required number of layers on the form before severing along the cemented line. Thus, as shown in FIG. 3, each bundle 10 may consist of, say, 5 x 5 elemental fibers. The exposed or cut ends of the fibers are then ground and polished optically. One end of the bundles is then mounted in a straight line and held in that line by the clamping bars 16, 17. The opposite end of the assembled bundles are disposed in a circular array and held between inner and outer clamping members 20, 21, forming a rigid circular frame assembly on a base 22.

Associated with the circularly arranged end of the assembly 10c of optical fibers is any suitable rotatable device, including for example a phototube 23. The phototube 23 is mounted for rotation around an axis 24 concentric with the circular array of fibers 10 and at such a distance therefrom so that it is always in optical alignment with the fixed circularly arranged ends of the fibers during roation of tube 23. Thus, as phototube 23 is rotated, it is excited by the light reflected from each elemental area of the subject matter or image on sheet 11 to produce corresponding facsimile signals which can be transmitted in any well known manner. On the other hand, if the sheet 11 is a photographically sensitive material and if the assembly is housed within a light tight housing, the phototube 23 can be replaced by a suitable source of signal modulated light, as will be described below, so as to expose the blank 11 to corresponding light values. In other words, the system of FIG. 1 can be used either as a facsimile transmitter or a facsimile reproducer.

In accordance with another feature of the invention, the assembly of optical fibers may be used to transmit light in opposite directions throughout their lengths. Such an arrangement is illustrated in FIG. 2, wherein the parts similar to those of FIG. 1 bear the same designation numbers. Associated with the fixed circularly arranged ends of the fibers 10 is a light tight housing 25 which is keyed or fastened to the rotating shaft 26. The left-hand wall of housing 25 is provided with a light aperture 26, the center of which is located so that as the housing 25 rotates, the aperture 26 is in optical alignment with the successive fiber bundles 10. Also mounted within the housing 25 in alignment with the aperture 26 and rotatable therewith is an optical system comprising suitable lens 27, 28, which collect the light emerging from the ends of the fibers 10 and focus the emergent light through a minute aperture 29 and on to the light-sensitive electrode 30 of any well known phototube 31.

Also mounted within the housing 25 and rotatable therewith is a light source, such as an electric lamp 32. The light from lamp 32 is focused by means of a suitable lens system 33 through the aperture 26 on to the ends of the fibers 10. The lens 33 may be mounted in a suitable bracket 34 carried by the tubular housing 36, which of course is fastened in any well known manner to the arm 37 which carries the housing 25. Preferably the lamp 32 is mounted in a bracket 38 fastened to arm 37 and provided with an adjusting arrangement represented by the threaded rack 39 and gear 40 so as to properly adjust the light rays from lamp 32 to enable them to be focused by lens 33 on the ends of the bundles 10. It should be observed that the scanned circularly arranged ends of the said fibers are ground and polished as described above. As shown in FIG. 4, the beam of light from the source 32 is reflected from the surfaces of the fibers, at different angles than the rays of the axial scanning beam 41. The opposite linearly arranged ends of the fibers are flat and in closely spaced relation to the sheet 11.

As the assembly 25 rotates, the ends of the fibers 10 are scanned consecutively, and since the opposite ends of the bundles are in linear array across the sheet 11, as shown in FIG. 1, the linear scanned elemental areas on that sheet are successively illuminated by the rays 42, and the reflected rays 41 are transmitted back through the optical fibers substantially parallel to the axis of each fiber so as to excite the phototube 31. Preferably, as shown in FIG. 4, the linearly arrayed ends of the optical fibers are spaced as close as possible to the surface of the subject copy 11. However, fiber optic tests have shown that light rays 41, entering parallel to the axis of a fiber, emerge also parallel; and rays 42 entering at a substantial angle to that axis emerge at same angle after multiple internal reflections within the fiber and from the outer surface of the fiber, as indicated generally by the arrows in FIG. 4. Thus, the respective beams from the exciter lamp 32 and the beam reaching the phototube 31 traverse the fiber without interference, where one beam, for example beam 41 is substantially coaxial with the fiber and the other beam 42 is at an angle to the axis of the fiber. In this manner, the difficulty of properly illuminating the subject copy at a scanning area closely spaced from the ends of the fibers is overcome.

As indicated in FIG. 4, each fiber is preferably provided with a coating 10b whereby they are optically insulated from each other although this coating may be replaced by any well known surface treatment of the fiber to render it totally reflecting to light rays within the fiber. For example in the case of glass fibers, the coating 10b may also be glass having a different refractive index from that of the fiber itself.

Figure 5:
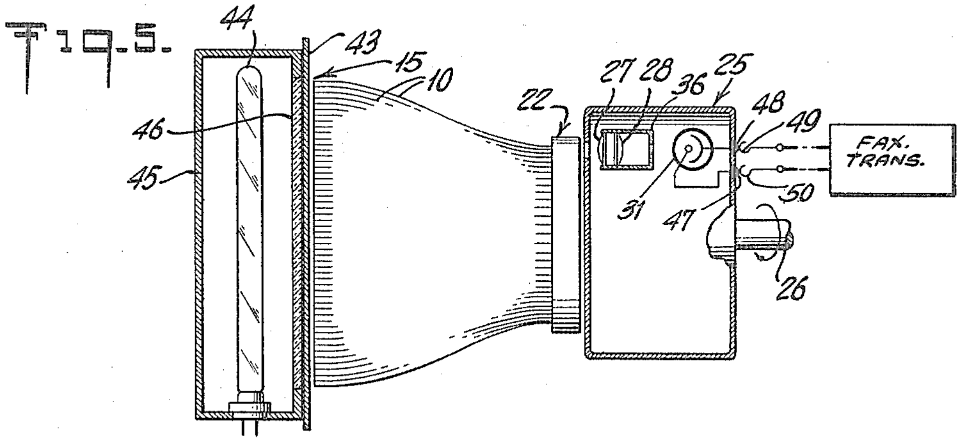
FIG. 5 is a modification of the embodiment of FIGS. 1 to 4.

The invention is also applicable to the scanning of subject matter copy in the form of photographic transparencies and the like. Such an arrangement is schematically illustrated in FIG. 5, wherein parts corresponding to those of FIGS. 1 and 2 bear the same designation numerals. In this embodiment the transparency 43 is fed past the scanning head 15 at the end having the linearly arranged ends of the optical fibers 10, as hereinabove described. The opposite side of the transparency 43 is illuminated with a line of light from a suitable lamp 44 in a housing 45 which is provided with a light transmitting window or slit 46 in linear alignment with the linearized ends of the optical fiber bundles 10. The remaining elements in FIG. 5 comprise the light-sensitive phototube 31 and a suitable optical system 27, 28 whereby the light passing through the slit 46 also passes through the transparency 43 and thence is transmitted through the optical fiber bundles 10 which at their circularly arranged ends in the frame 22 are scanned successively as the housing 25 is rotated. It will be understood, of course, that the phototube 31 in FIG. 5, as in FIG. 2, has its terminals connected to a pair of slip rings 47, 48 so that during rotation of the housing 25 the phototube 31 is maintained in electrical contact with the cooperating brushes 49, 50.

Figure 6:
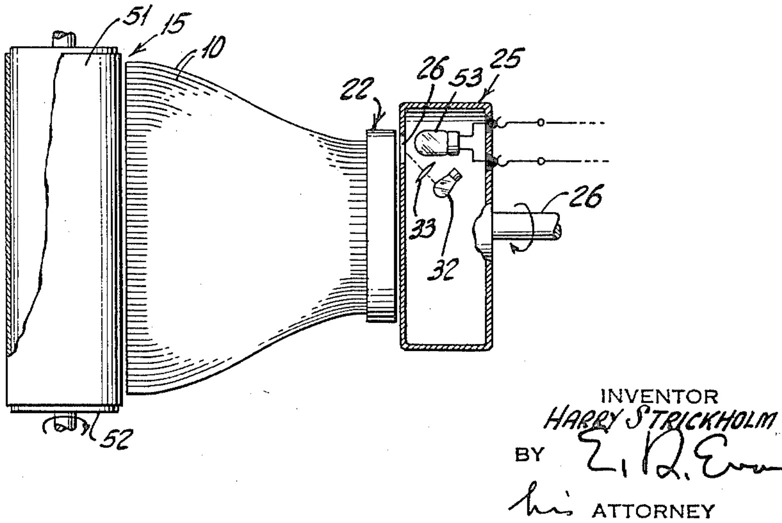
FIG. 6 is another modification of the embodiment of FIGS. 1 to 4.

FIG. 6 shows the invention applied to a facsimile scanner of the rotary drum kind. In FIG. 6 the elements which are the same as those of FIG. 2, bear the same numerals. In FIG. 6 the subject matter to be scanned may be in the form of a sheet 51 wrapped around a rotary drum 52. The linearized ends of the optical fiber bundles 10 are in close proximity to the sheet 51 and they transmit the light from the copy 51 to their circularly arrayed ends anchored in the frame 22. The said circularly arranged ends are scanned through the aperture 26 as the housing 25 is rotated. It will be understood, of course, that the arrangement of FIG. 6 may be used either as a facsimile transmitter or a facsimile receiver. When used as a facsimile receiver, the housing 25 carries the modulated light source or lamp 53, thus exposing the light-sensitive film 51 on the drum 52. On the other hand, if the arrangement of FIG. 6 is used as a facsimile transmitter, the composite illumination and light-sensitive arrangement of FIG. 2 may be used. In other words, the bundles 10 can be illuminated by a lamp 32 and optical system 33, and the lamp 53 can be replaced by a phototube, such as phototube 31 of FIG. 2, and its associated optical system 27, 28.

Various changes and modifications may be made in the disclosed embodiments of the invention without departing from the spirit and scope thereof. For example, the invention may be embodied in various scanning and read-out systems instead of the flat-type facsimile machine illustrated by way of example. Obviously, the form and arrangement of the optical fibers may be widely varied for different purposes, if desired. Also any suitable radiant energy- or light-sensitive device may be employed in connection with the fiber-optics transmission link embodying the invention.

What is claimed is:

1. Electro-optical scanning apparatus, comprising in combination, a multiplicity of optical fibers, means anchor-ing one end of the fibers adjacent to but in closely spaced relation to subject matter to be scanned, means anchoring the opposite ends of the fibers in a circular array, a light-source and phototube assembly rotatable as a unit concentric with said circular array to illuminate and scan said fibers in cyclical succession and optical means in said light-source and phototube assembly for causing the illuminating and scanning rays at said fiber ends to have different angles with respect to the axes of said fibers.

2. Electro-optical scanning apparatus according to claim 1, in which one of said rays travels substantially axially along each fiber as it is being scanned and the other of said rays travels at greater angles to the axis along each fiber as it is being scanned, said rays traveling simultaneously through the scanned fiber in opposite directions.

3. Electro-optical scanning apparatus, comprising in combination, means to feed a record sheet in substantially flat form past a scanning line, a multiplicity of optically insulated adjacent light transmitting fibers, means anchoring said fibers at one end in linear array of elemental-area width parallel to said scanning line, means anchoring the opposite ends of the fibers in circular array, and means including a rotary scanning assembly comprising a source of scanning light and a phototube for illuminating and scanning simultaneously elemental portions of said circular array of fibers.

4. Electro-optical scanning apparatus, comprising in combination, a multiplicity of optical fibers forming a fiber optical unit, means anchoring one end of the fiber unit closely adjacent subject matter to be scanned, a rotary scanning assembly, and means anchoring the opposite end of the fiber unit adjacent said rotary scanning assembly, said rotary scanning assembly including a light source and a phototube, and comprising two optical systems, one in alignment with the optical axis of each fiber as it is being scanned, the other optical system being at a substantial angle with respect to said axis, whereby each fiber can be used to transmit light to illuminate a corresponding elemental area of the subject matter being scanned and simultaneously to transmit the light reflected from said elemental area back to said phototube.

References Cited in the file of this patent

UNITED STATES PATENTS

| | | |
|---|---|---|
| Re. 21,105 | Round | May 30, 1939 |
| 1,760,866 | Belin | June 3, 1930 |
| 2,410,104 | Rainey | Oct. 29, 1946 |
| 2,939,362 | Cole | June 7, 1960 |
| 3,029,717 | Hildebrant | Apr. 17, 1962 |
| 3,036,153 | Day | May 22, 1962 |